United States Patent
Funamoto et al.

(10) Patent No.: US 6,816,216 B2
(45) Date of Patent: Nov. 9, 2004

(54) OPTICAL COMPONENT AND REFLECTIVE PLATE, AND DEVICE USING THE SAME OPTICAL COMPONENT

(75) Inventors: Akihiro Funamoto, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 171 days.

(21) Appl. No.: 10/120,204

(22) Filed: Apr. 10, 2002

(65) Prior Publication Data

US 2002/0149723 A1 Oct. 17, 2002

(30) Foreign Application Priority Data

Apr. 12, 2001 (JP) ........................................ 2001/114577

(51) Int. Cl.$^7$ ..................... G02F 1/1333; G02F 1/1335; G02B 27/64
(52) U.S. Cl. ....................... 349/113; 349/106; 349/102; 359/556
(58) Field of Search ................................ 349/113, 106, 349/102, 112; 359/556, 537, 538, 555, 599

(56) References Cited

U.S. PATENT DOCUMENTS

| | | | | |
|---|---|---|---|---|
| 5,841,496 A | * | 11/1998 | Itoh et al. | 349/113 |
| 5,936,688 A | * | 8/1999 | Tsuda et al. | 349/113 |
| 6,181,396 B1 | * | 1/2001 | Kanoh et al. | 349/113 |
| 6,219,119 B1 | * | 4/2001 | Nakai | 349/113 |
| 6,556,260 B1 | * | 4/2003 | Itou et al. | 349/69 |
| 2002/0163609 A1 | * | 11/2002 | Sakamoto et al. | 349/113 |
| 2003/0007113 A1 | * | 1/2003 | Yamanaka et al. | 349/113 |

FOREIGN PATENT DOCUMENTS

JP 2000-105370 * 4/2000

OTHER PUBLICATIONS

Patent Abstracts of Japan, Publication No. 2000–105370; Apr. 11, 2000, 3 pgs.

* cited by examiner

Primary Examiner—Tarifur R. Chowdhury
Assistant Examiner—Mike Qi
(74) Attorney, Agent, or Firm—Osha & May L.L.P.

(57) ABSTRACT

In a reflective type liquid crystal display unit which is provided with a reflective plate, there is provided a reflective liquid crystal display unit free from color mixture by preventing color mixing of reflected light is presented. The unit includes a substrate, a reflective layer disposed on the substrate, and a color filter, wherein the reflective layer has a plurality of reflective unit regions each of which has a first reflective surface for reflecting a light in a predetermined direction, and an inclination angle of the first reflective surface is defined so that an incident light which passes through a pixel of a determined color of the color filter to enter the first reflective surface is reflected by the first reflective surface to pass through the pixel of the same color as the color through which the incident light of the color filter has passed.

10 Claims, 9 Drawing Sheets

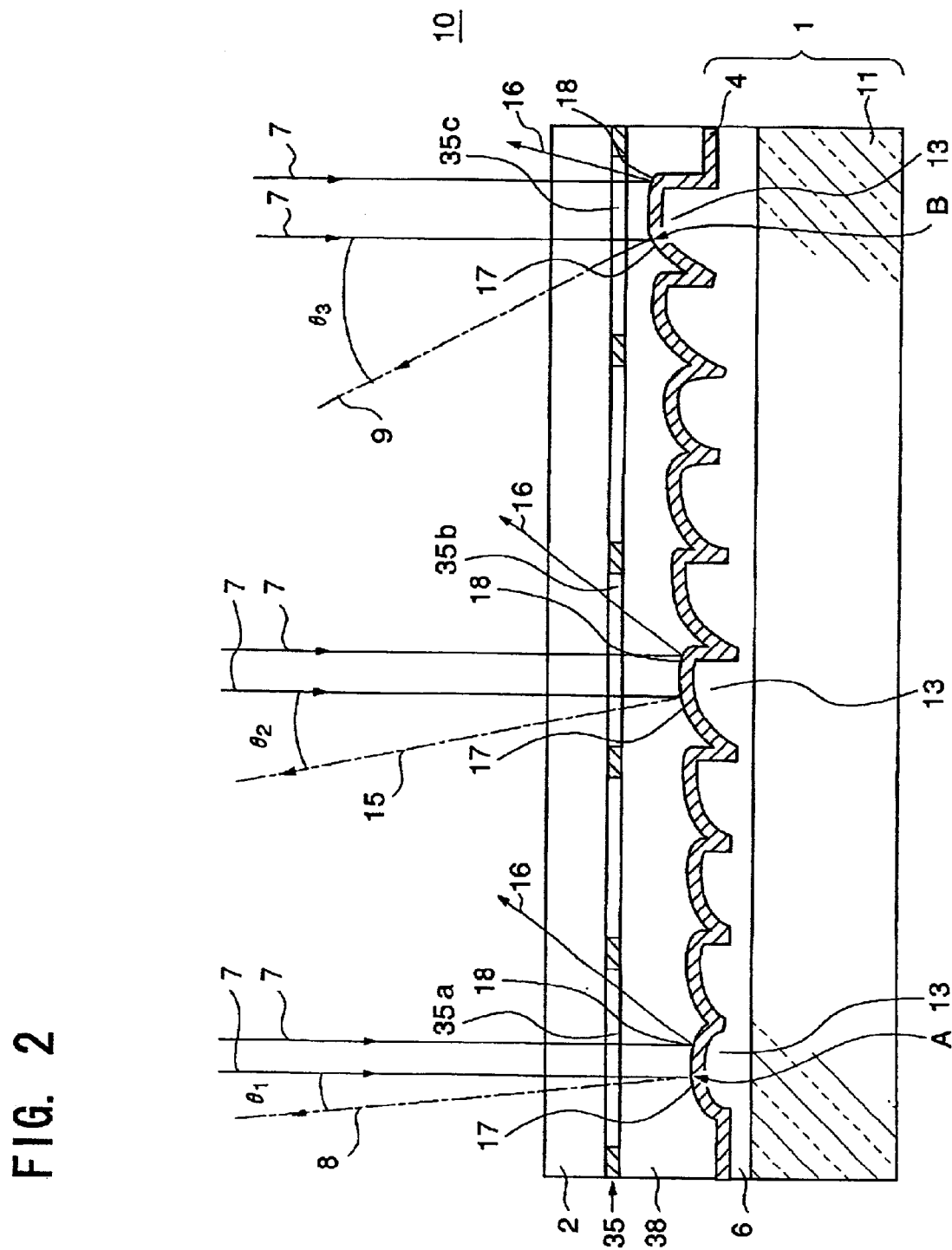

(PRIOR ART)

OPTICAL COMPONENT AND REFLECTIVE PLATE, AND DEVICE USING THE SAME OPTICAL COMPONENT

BACKGROUND OF THE INVENTION

1. Field of the Invention

The present invention relates to an optical component and a reflective plate for reflecting an incident light in a predetermined direction, and a device using the same optical component, and more particularly to a light reflection method for reflecting an incident light in a predetermined direction.

2. Description of the Related Art

Recently, liquid crystal displays are applied widely in personal computers, television receivers, word processors, video tape recorders and the like. In these electronic devices, while higher functions are required, there is an increasing demand for reflective liquid crystal display unit for displaying a liquid crystal image by reflecting the light entering from outside, without using backlight, in order to reduce in size, power consumption and the cost.

In such reflective type liquid crystal display, since backlight is not used, it is required to illuminate the liquid crystal display screen from behind by effectively utilizing the incident light from outside.

As shown in FIG. 9A, a reflective type liquid display 50 is constituted by interposing a liquid crystal layer 54 between a reflective plate 51 and an upper substrate 52, and the reflective plate 51 is made of a resinous layer 55 and a reflection film 56 disposed on a lower substrate 53.

An incident light 58 entering the reflective type liquid crystal display 50 is separated into a first reflected light 59 reflected by the reflective film 56, and a second reflected light 60 reflected on an upper surface of the upper substrate 52. However, when the first reflected light 59 and the second reflected light 60 are reflected in the same direction, the light source is overlapped and recognized on the image of the liquid crystal display.

Accordingly, there has been proposed that a pattern formed of a number of irregularities 57 is arranged on the surface of the reflective film 56 as shown in FIG. 9B, and the incident light is scattered and reflected by the bumps 57 as shown in FIG. 9C. The scattering of the light entering the reflective film 56 by the irregularities 57 allows the LCD screen to illuminate by using the light directing in a different direction from the second reflective light 60, among the scattered light 61, so that it is possible to view the LCD screen from a direction that the light source is not overlapped on the image.

However, since the scattered light 61 scatters the incident light 58, the incident light 58 is reflected also in the direction not used in recognition of the LCD screen or in the same direction as the second reflected light 60.

In addition, if a color filter is disposed inside of the reflective type liquid crystal display 50 in order to obtain a color image, the scattered light 61 also passes through a pixel of a different color from the pixel of color filter through which the incident light 58 has transmitted, and a color mixture occurs in the image to be recognized.

SUMMARY OF THE INVENTION

An optical component according to the present invention includes a substrate, a reflective layer disposed on the substrate, and a color filter, wherein the reflective layer has a plurality of reflective unit regions each of which has a first reflective surface for reflecting a light in a predetermined direction, and an inclination angle of the first reflective surface is defined so that an incident light which passes through a pixel of a determined color of the color filter to enter the first reflective surface is reflected by the first reflective surface to pass through the pixel of the same color as the color through which the incident light of the color filter has passed.

A liquid crystal display unit according to the present invention includes a substrate, a reflective layer disposed on the substrate, a liquid crystal layer disposed on an opposite side to the substrate of the reflective layer, and a color filter disposed on an opposite side to the substrate of the reflective layer, wherein the reflective layer has a plurality of reflective unit regions each of which has a first reflective surface for reflecting a light in a predetermined direction, and an inclination angle of the first reflective surface is defined so that an incident light, which passes through the liquid crystal layer and a pixel of a predetermined color of the color filter to enter the first reflective surface, is reflected by the first reflective surface to pass through the pixel of the same color as the color through which the incident light of the color filter has passed.

A reflective plate according to the present invention includes a substrate, and a reflective layer disposed on the substrate, wherein the reflective layer has a plurality of reflective unit regions each of which has a first reflective surface for reflecting a light in a predetermined direction, and a second reflective surface for reflecting a light in a direction different from that of the first reflective surface, a reflected light, which is reflected by the first reflective surface, intersects with a reflected light, which is reflected by a first reflective surface in other reflective unit region, to form a common emission region, and a reflected light, which is reflected by the second reflective surface, is reflected by the first reflective surface, which is disposed adjacently to the second reflective surface through a coupling portion, to emit in a direction different the the emission region.

An electronic device according to the present invention includes a liquid crystal display unit disposed in an image display part, wherein the liquid crystal display unit includes a substrate, a reflective layer disposed on the substrate, a liquid crystal layer disposed on an opposite side to the substrate of the reflective layer, and a color filter disposed on an opposite side to the substrate of the reflective layer, the reflective layer has a plurality of reflective unit regions each of which has a first reflective surface for reflecting a light in a predetermined direction, and an inclination angle of the first reflective surface is defined so that an incident light, which passes through the liquid crystal layer and a pixel of a predetermined color of the color filter to enter the first reflective surface, is reflected by the first reflective surface to pass through the pixel of the same color as the color through which the incident light of the color filter has passed.

In a light reflection method according to the present invention, an incident light, which enters by passing through a color filter, and a first reflected light, which reflects the incident light by a first reflective surface and emits by passing through the color filter, pass through a pixel of the same color as the color filter.

According to this light reflection method, since the incident light and the reflected light pass through the pixel of the same color as the color filter, a reflected light free from color mixture can be obtained.

BRIEF DESCRIPTION OF THE DRAWINGS

FIG. 2 shows an explanatory diagram of a main part of the reflection type liquid display device in FIG. 1.

DESCRIPTION OF THE PREFERRED EMBODIMENT

Figure 1:
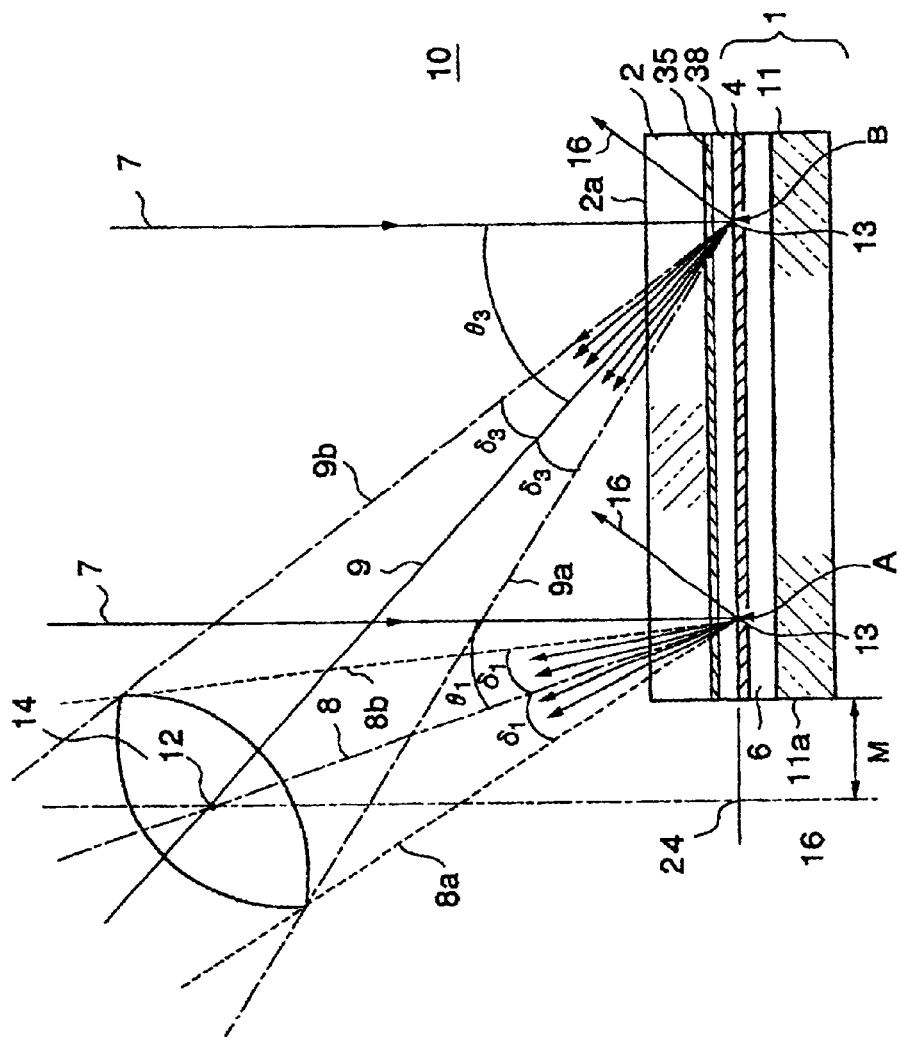
FIG. 1 shows an explanatory diagram of a reflection type liquid display device according to an embodiment of the present invention.

Referring now to the drawings, a preferred embodiment of the present invention are exemplarily and specifically described below. In the illustrated embodiments, however, dimensions, materials, shapes and relative configuration of the constituent components are not intended to limit the scope of the invention, unless otherwise predetermined, and are mere explanatory examples.

FIG. 1 shows an explanatory diagram of a reflective liquid crystal display unit 10 in an embodiment of the invention, and FIG. 2 shows an explanatory diagram of its essential parts.

In FIG. 1, a reflective plate 1 comprises a transparent lower substrate 11 made of glass, and a reflective layer composed of a resinous layer 6 and a reflective film 4 disposed on the lower substrate 11, and by disposing a color filter 35 and an upper substrate 2 on the top of the reflective plate 11 through a liquid crystal layer 38, a reflective liquid crystal display unit 10 is composed. FIG. 1 is a schematic diagram, and therefore the difference in refractive index of the liquid crystal layer 38, color filter 35, and upper substrate 2 is not taken into consideration in the drawing. In FIG. 1, the reflective film 4 is shown in a flat state, but actually an undulated shape is formed on the top of the resinous layer 6 as shown in FIG. 2, and the reflective film 4 is disposed on the top. The reflective film 4 formed in an undulated shape is called a reflective unit region 13, and this reflective unit region 13 has two light reflective surfaces, that is, a valid reflective surface 17 for reflecting an incident light 7 in a direction of viewing the image, and an invalid reflective surface 18 for reflecting the light in a direction not relating to viewing of the image.

The reflective plate 1 may be also composed by disposing the resinous layer 6 forming the reflective film 4 on the surface beneath the lower substrate 11 by way of a light permeable layer. Or, without using the resinous layer 6, the reflective unit region 13 may be formed by directly undulating the surface of the lower substrate 11.

The incident light 7 entering the reflective liquid crystal display unit 10 from the perpendicular direction is partly reflected regularly on the top of the upper substrate 2, but the light passing through the upper substrate 2 reaches the reflective unit region 13. Since the reflective unit region 13 is disposed by varying the inclination angle of the valid reflective surface 17 as going from region A to region B, the incident light 7 is reflected (reflected light 8) at angle $\theta_1$ in region A, and reflected (reflected light 9) at angle $\theta_3$ in region B.

The valid reflective surface 17 has a curved surface, and the reflected light 8 forms a nearly circular exit region 14 spreading as reflected lights 8a, 8b in a range of angle $\delta_1$, and the reflected light 9 forms the same exit region 14 spreading as reflected lights 9a, 9b in a range of angle $\delta_3$. The center 12 of the exit region 14 formed at a vertical upward position of the position at a distance of M from the end face of the upper substrate 2 of the reflective liquid crystal display unit 10.

By defining the center 12 of the exit region 14 at such position, the image displayed by the reflective liquid crystal display unit 10 can be recognized in a region different from the regular reflection region of regular reflection of the incident light 7 on the top of the upper substrate 2, and therefore the reflective liquid crystal display unit 10 of bright and high contrast display is obtained. In the exit region 14, moreover, since the reflected lights from various positions of the reflective liquid crystal display unit 10 are collected, and the reflective liquid crystal display unit 10 of small luminance distribution within the display plane is obtained.

The inclination angle of the valid reflective surface 17 of the reflective unit region 13 is set so as to increase the angle $\theta$ between the reflected lights 8, 15, 9 and the incident light 7 as going from region A to region B as shown in FIG. 2. Entering the reflective liquid crystal display unit 10 from the perpendicular direction, the incident light 7 passing through the upper substrate 2 and pixels of predetermined colors 35a, 35b, 35c of the color filter 35 is reflected, and the inclination angle of the valid reflective surface 17 is determined so that the reflected lights 8, 15, 9 may pass through the same color pixels as the incident light 7.

By thus defining the reflection angle, a clear color image free from color mixture is obtained. Herein, the pixels of the color filter through which the reflected lights 8, 15, 9 pass may be either same pixels 35a, 35b, 35c as the incident light 17 as shown in FIG. 2, or pixels disposed at different positions from the pixels through which the incident light 17 passes, and the same effects are obtained as far as the pixels are of the same colors.

Incidentally, since the reflective unit region 13 has an undulated shape, it includes an invalid reflective surface 18 for reflecting the incident light 7 in a direction not relating to viewing of the image. That is, the incident light 7 entering the reflective liquid crystal display unit 10 from the perpendicular direction is reflected by the invalid reflective surface 18, and is emitted in a direction different from the exist region 14, but the inclination angle of the invalid reflective surface 18 is determined so that the reflected light 16 may enter at an angle smaller than the critical angle to the interface of the constituent members of the reflective liquid crystal display unit 10 such as the color filter 35 and upper substrate 2 and may be emitted to outside of the upper substrate 2.

Thus, by defining the inclination angle of the invalid reflective surface 18, the reflected light 16 is prevented from becoming stray light in the reflective liquid crystal display unit 10. That is, the stray light is prevented from leaving from the direction of the exit region 14 by passing through pixels of different colors from the pixels of the color filter 35 through which the incident light 7 has passed, while repeating total reflection inside of the reflective liquid crystal display unit 10, and therefore color mixture by stray light can be avoided, and a clear color image can be viewed.

Figure 3A:
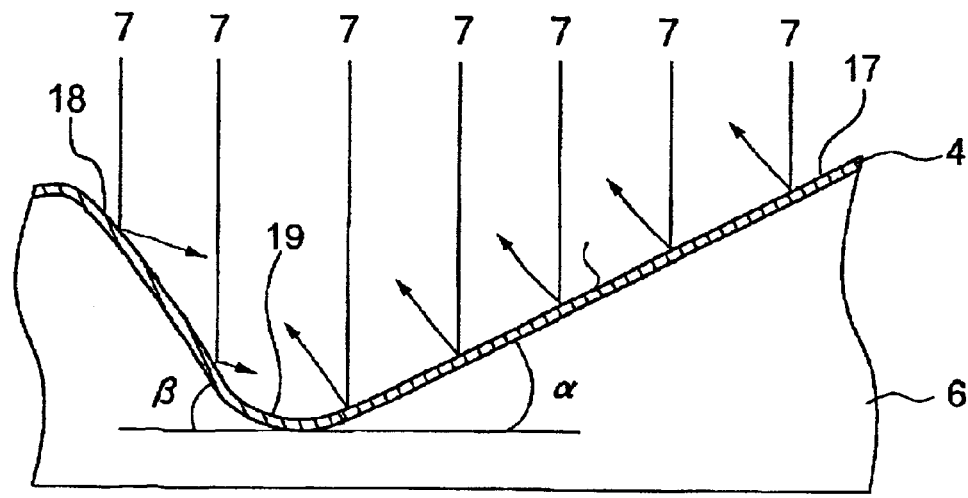
FIGS. 3A and 3B show explanatory diagrams of reflective unit regions.

Examples of the shape of the reflective unit region 13 are explained by referring to FIGS. 3A and 3B, and FIGS. 4A and 4B. FIGS. 3A and B are explanatory diagrams of the shape of the reflective unit region 13 in the reflective liquid crystal display unit 10, and FIGS. 4A and B are explanatory diagrams of optical path in the valid reflective surface 17 and invalid reflective surface 18.

The composition common to the reflective liquid crystal display unit 10 in FIG. 1 and FIG. 2 is not particularly explained herein. In the drawing, the difference in refractive index of the upper substrate 2, color filter 35, and liquid crystal layer 38 is ignored.

Figure 3B:
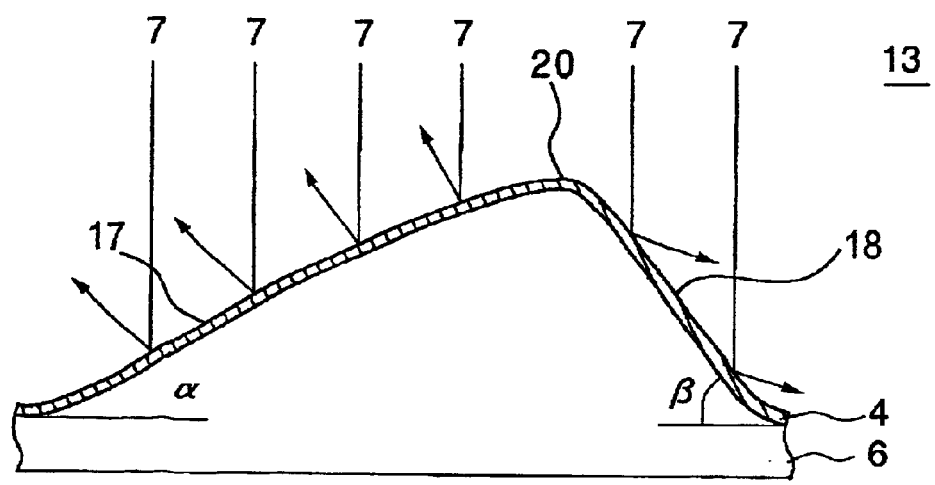

In FIGS. 3A and B, the reflective unit region 13 is composed by coupling the invalid reflective surface 18 and valid reflective surface 17 through coupling portions 19, 20. Herein, the reflective unit region 13 may be either concave as shown in FIG. 3A or convex as shown in FIG. 3B. Or plural concave and convex shapes may be combined to form the reflective unit region 13. The reflective surface of the invalid reflective surface 18 and valid reflective surface 17 may be either flat or curved.

The inclination angle β of the invalid reflective surface 18 is set so as to be larger than the inclination angle α of the valid reflective surface 17, and the area of the reflective surface of the invalid reflective surface 18 is set to be smaller than the area of the reflective surface of the valid reflective surface 17. By defining the shape in this manner, as shown in FIG. 3A, the area for reflecting the incident light 7 can be set larger on the valid reflective surface 17, and the reflected light relating to viewing of the image can be obtained more, so that the light utilization efficiency is enhanced.

In this manner, the shape of the valid reflective surface 17 may be defined so that the reflected light reflected by the valid reflective surface 17 may be directed to the exit region 14 shown in FIG. 1 and FIG. 2.

The shape of the invalid reflective surface 18 and valid reflective surface 17 is set so as to decrease or increase monotonously, and the coupling portions 19, 20 of the invalid reflective surface 18 and valid reflective surface 17 are shaped in a curvature monotonously changing in the inclination of the tangent side. More specifically, the curvature of the coupling portions 19, 20 is set to have a radius of more than two times of the thickness of the reflective film 4.

By thus defining the shape of the invalid reflective surface 18, valid reflective surface 17, and coupling portions 19, 20, the direction of the reflected light can be controlled continuously. Besides, since there is no sudden change in the shape, possibility of forming defective film or crack in the reflective film 4 is lowered when forming the reflective film 4 on the surface of the resinous layer 6, and a uniform reflective film 4 can be obtained. Further, by forming the reflection film 4 by using metal film, the reflection film 4 can also play the role of electrode of the reflective liquid crystal display unit 10, and in this case, too, the electrode free from wire breakage can be obtained.

Figure 4A:
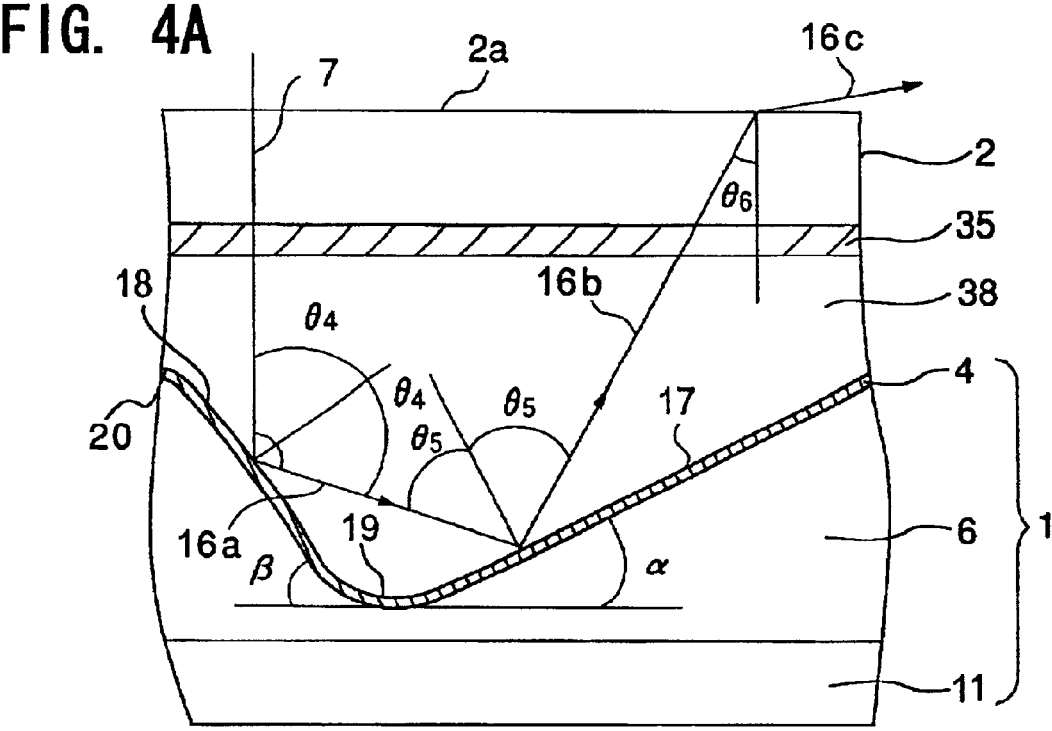
FIGS. 4A and 4B show explanatory diagrams of shape of a valid reflective surface and an invalid reflective surface.

As shown in FIG. 4A, the invalid reflective surface 18 and valid reflective surface 17 are defined in the inclination angle so as to satisfy the condition in which the incident light 7 entering the reflective liquid crystal display unit 10 from a perpendicular direction is reflected by the invalid reflective surface 18 to be a reflected light 16a, and successively reflected by the valid reflection lane 17 coupled to the invalid reflective surface 18 through the coupling portion 19 to be a reflected light 16b, and further passes through the liquid crystal layer 38 and color filter 35, enters the interface 2q of the upper substrate 2 and outside at an angle smaller than the critical angle, and is emitted to outside of the upper substrate 2 as a reflected light 16c.

By thus defining the inclination angle, the reflected lights 16a, 16b, 16c are prevented from being stray light inside the reflective liquid crystal display unit 10, and the area of the invalid reflective surface 18 can be decreased, and therefore the majority of the incident light 7 can be reflected by the valid reflective surface 17, so that the reflective liquid crystal display unit 10 free from color mixture and high in light utilization efficiency can be realized.

The inclination angle of the valid reflective surface 17 and invalid reflective surface 18 is explained. In FIG. 4A, the incident angle of the incident light 7, once entering the reflective liquid crystal display unit 10 from a perpendicular direction, to enter the invalid reflective surface 18 is supposed to be $\theta_4$, the incident angle of the reflected light 15 to enter the valid reflective surface 17 to be $\theta_5$, and the reflected light 16b to enter the interface 2a of the upper substrate 2 and outside to be $\theta_6$.

At this time, the following relation is established among the inclination angle α of the valid reflective surface 17, the inclination angle β of the invalid reflective surface 18, and incident angles $\theta_4$, $\theta_5$, $\theta_6$, $\theta_4=\beta$, $\theta_5=180°-\alpha-2\beta$, $\theta_6=180°-2\alpha-2\beta$.

Supposing the refractive index of the upper substrate 2 to be $n_1$, and the refractive index of the outside layer of the upper substrate 2 to be n, in order that the reflected light 16b be emitted to outside of the upper substrate 2 as reflected light 16c, it is enough to satisfy the condition of $\sin\theta_6 < n/n_1$ according to Snell's law.

Herein, assuming the outside layer of the upper substrate 2 to be an air layer with a refractive index of about 1, when a transparent substrate with a refractive index of about 1.5 such as glass substrate is used in the upper substrate 2, in order that the reflected light 22 be emitted as reflected light 16c to outside of the upper substrate 2, it is enough to satisfy the condition of $\theta_6 < 40°$. That is, by defining the inclination angle β of the valid reflective surface 17 and invalid reflective surface 18 so as to satisfy the condition of $2\alpha+2\beta > 140°$, the incident light entering the reflective liquid crystal display unit 10 from a perpendicular direction is prevented from becoming stray light inside the reflective liquid crystal display unit 10.

Figure 4B:
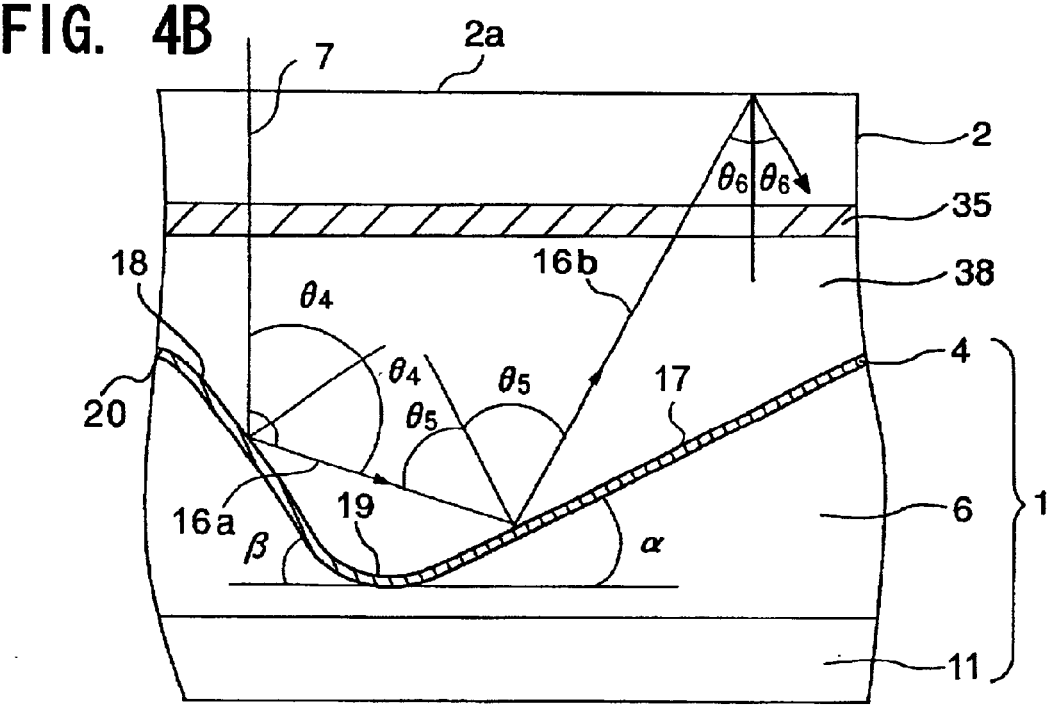

In the case of $2\alpha+2\beta < 140°$, to the contrary, as shown in FIG. 4B, the reflected light 16b is not emitted to outside of the upper substrate 2 but is totally reflected by the interface 2a of the upper substrate 2 and the outside, and the incident light 7 becomes straight light inside the reflective liquid crystal display unit 10.

Considering from this relation, when the inclination angle α of the valid reflective surface 17 is set slightly larger than 0°, it is enough to set the inclination angle β of the invalid reflective plane 18 larger than 70°.

In the valid reflective surface 17, its inclination angle a is often set at $\alpha > 10°$ in order to reflect the incident light 7 in a direction of viewing the image of the reflective liquid crystal display unit 10. In such a case, it is enough to set the inclination angle of the invalid reflective surface 18 at $\beta > 60°$. However, if $\beta > 90°$, the incident light 7 entering the reflective liquid crystal display unit 10 from a perpendicular direction cannot be reflected on the invalid reflective surface 18, and hence the inclination angle β of the invalid reflective surface 18 at 60°<β<90°.

In the above explanation, the inclination angle of the valid reflective surface 17 and invalid reflective surface 18 is determined on the basis of the incident light 7 entering the reflective liquid crystal display unit 10 from a perpendicular direction, but the inclination angle of the valid reflective surface 17 and invalid reflective surface 18 may be also determined on the basis of the incident light entering from other direction.

Figure 5:
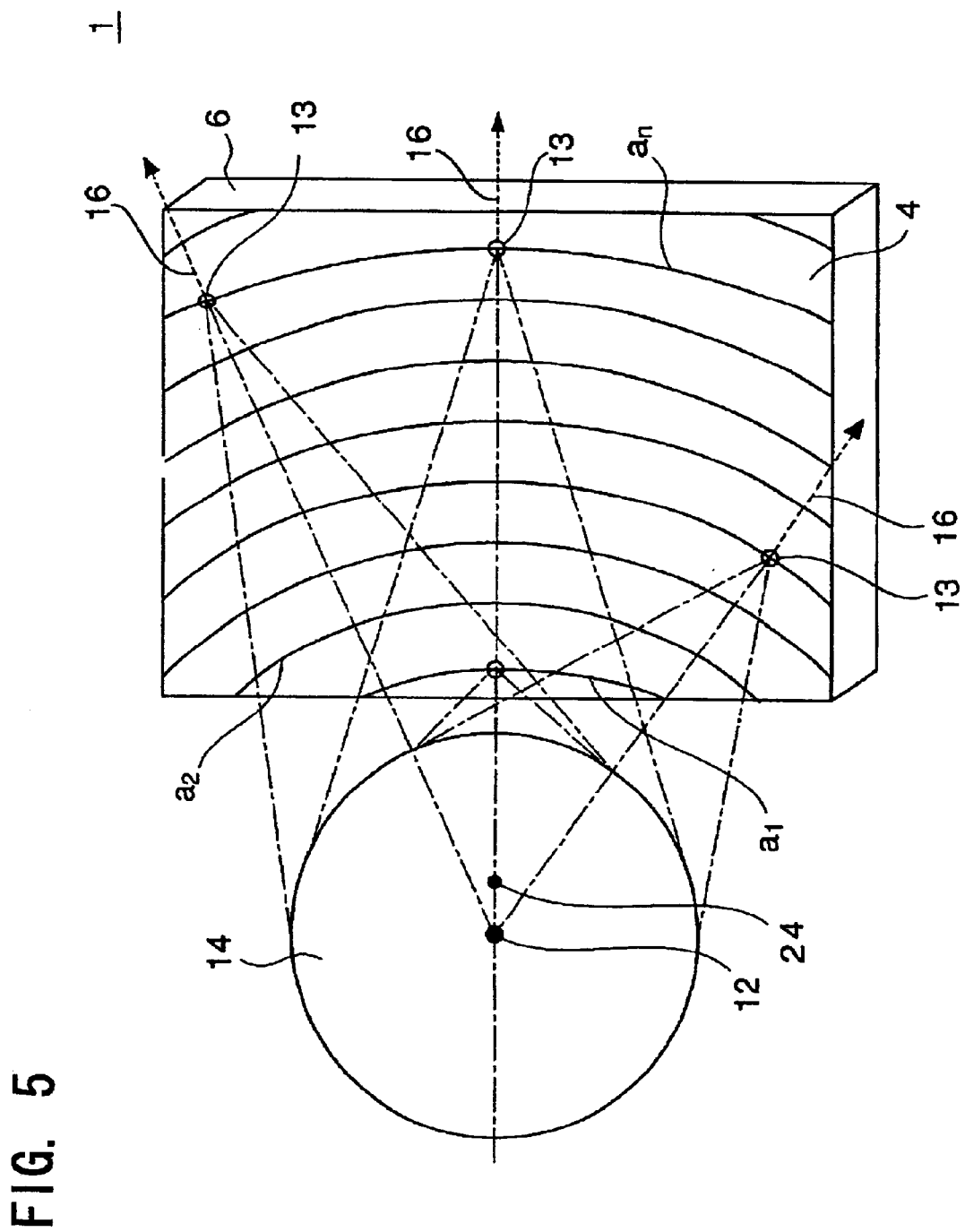
FIG. 5 shows a plan view of a reflective plate according to an embodiment of the invention.

FIG. 5 shows a plan of the reflective plate 1 including the reflective unit region 13 having the valid reflective surface 17 and invalid reflective surface 18 with the shape determined as mentioned above. The reflective unit region 13 projects the center 12 of the exist region 14 on a virtual plane including the reflective film 4, and is disposed on the concentric circles $a_1, a_2, \ldots, a_n$ (n being 1 or larger integer) centered on the projection point 24. On the same radius of the concentric circle, plural reflective unit regions 13 having a valid reflective surface 17 equal in the reflection angle are disposed.

In each reflective unit region 13, the inclination angle of the valid reflective surface 17 is determined so as to reflect the incident light entering the reflective plate 1 from a perpendicular direction by the valid reflective surface 17, form an exit region 14, and concentrate the peak of the reflected light from each reflective unit region 13 on the center 12 of the exit region 14.

The reflected light 16 reflected by the invalid reflective surface 18 is emitted in a direction different from the exit region 14.

Figure 6:
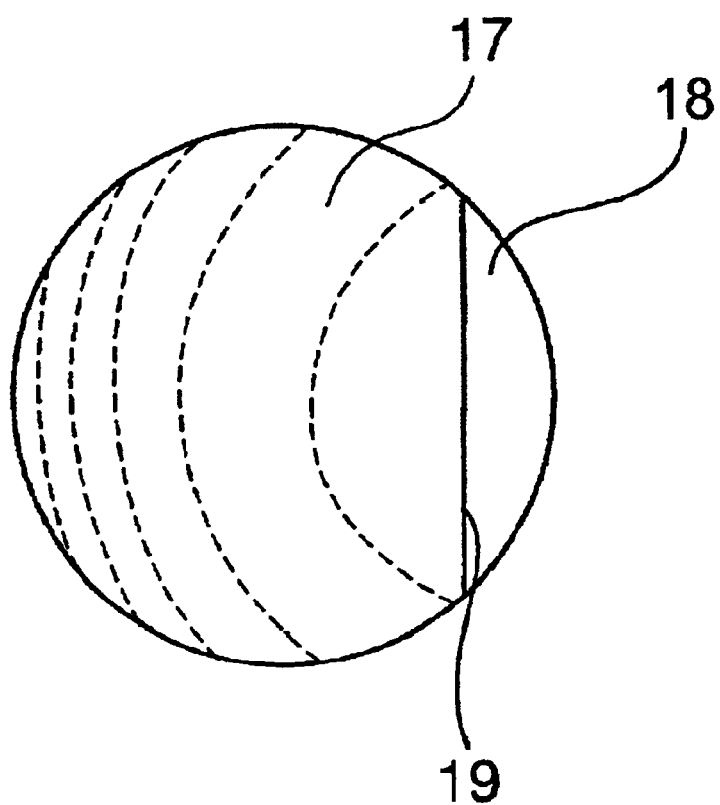
FIG. 6 shows a plan of a reflective unit region.

FIG. 6 shows a plan of the reflective unit region 13 disposed in the reflective plate 1. In FIG. 6, the broken line shows a contour line.

The valid reflective surface 17 is connected to the invalid reflective surface 18 through a coupling portion 20, and the reflective unit region 13 has a slope toward the direction of the exit region 14. The valid reflective surface 17 has a curved surface increasing or decreasing monotonously in the curvature in order to form the exit region 14 by the reflected light.

The reflective unit regions 13 are basically arranged periodically or regularly, but are not required to be uniform in size, but may be random in size.

Figure 7:
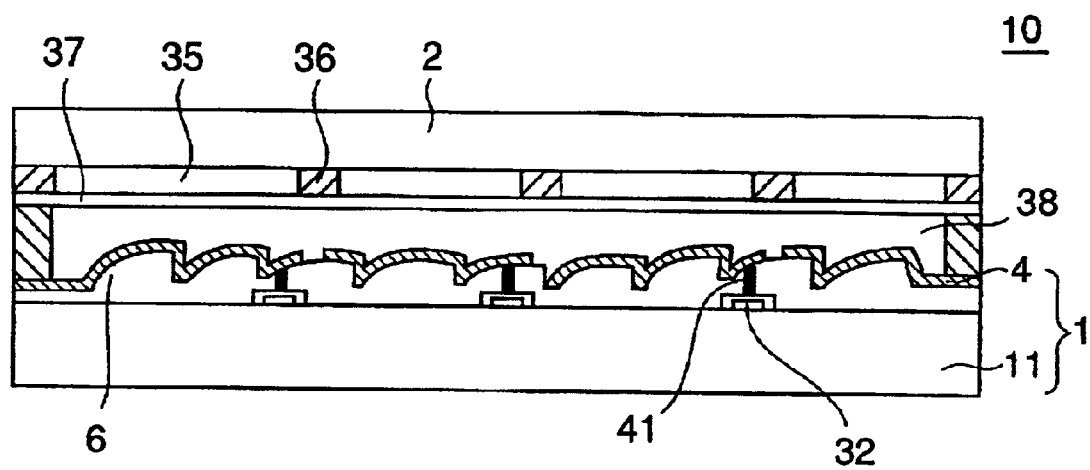
FIG. 7 shows a schematic sectional view of a reflective type liquid crystal display unit according to an embodiment of the present invention.

FIG. 7 is an explanatory diagram showing a structure of the reflective liquid crystal display unit 10 having the reflective plate 1 fabricated in this manner. A thin film transistor (TFT) 32 is provided on the surface of the lower substrate 11. A resinous layer 6 having an undulated surface is disposed on the lower substrate 11, and the surface of the resinous layer 6 is coated with a reflective film 4 made of a thin metal film. The reflective film 4 conducts with the TFT 32 through a contact hole 41.

A liquid crystal layer 38 is enclosed between the reflective plate 1 having such structure, and the upper substrate 22 forming black matrix 36, color filter 35, and transparent electrode (ITO) 37 on the back side, thereby composing the reflective liquid crystal display unit 10.

The reflective liquid crystal display unit 10 having such structure can present a bright and clear image high in contrast and free from color mixture.

The reflective plate of the embodiment can be used not only in the reflective liquid crystal display unit, but also in other reflective display devices. Although not shown in the drawing, when used in a semi-transmissive liquid crystal display unit, the light source power consumption of the backlight can be saved.

Figure 8:
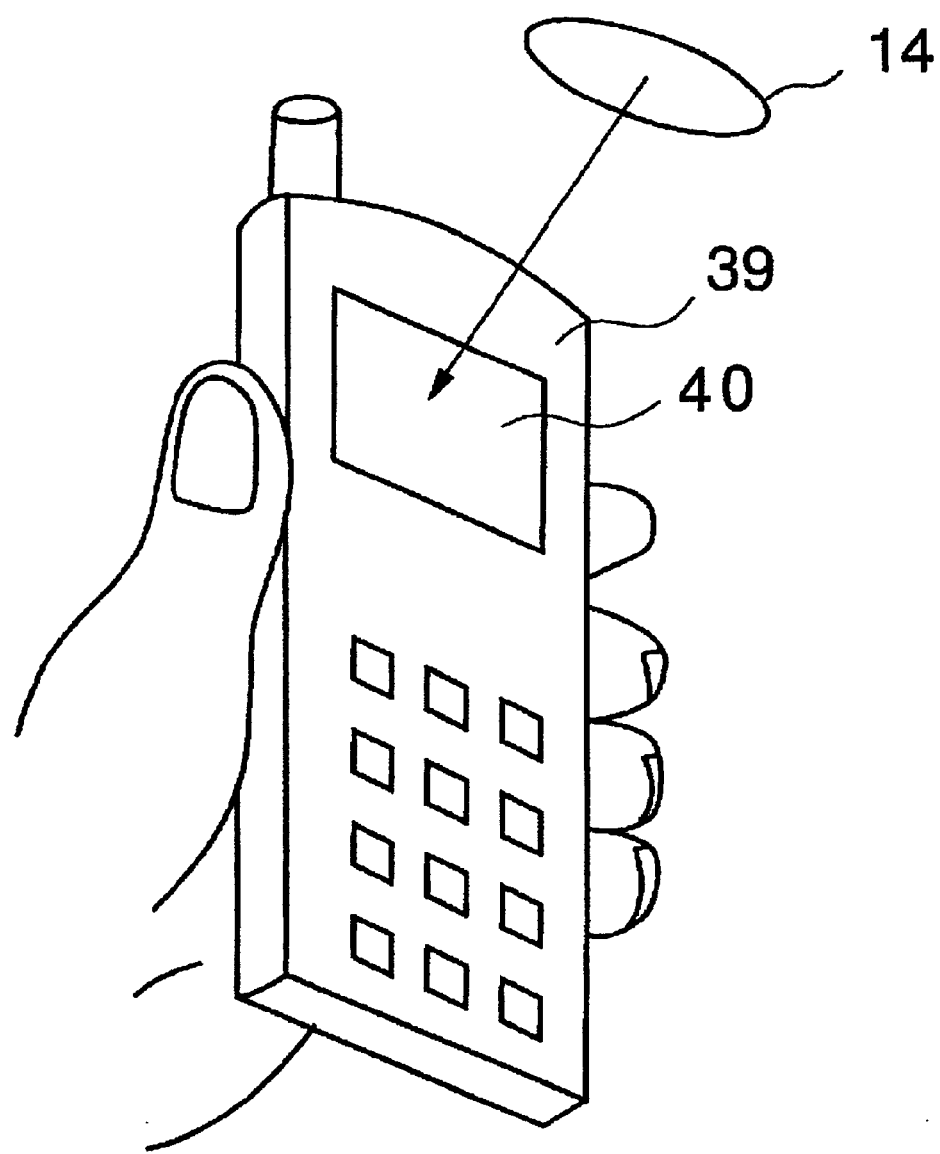
FIG. 8 shows a perspective view of a wireless information transmitting device according to an embodiment of the present invention.
Figure 9A:
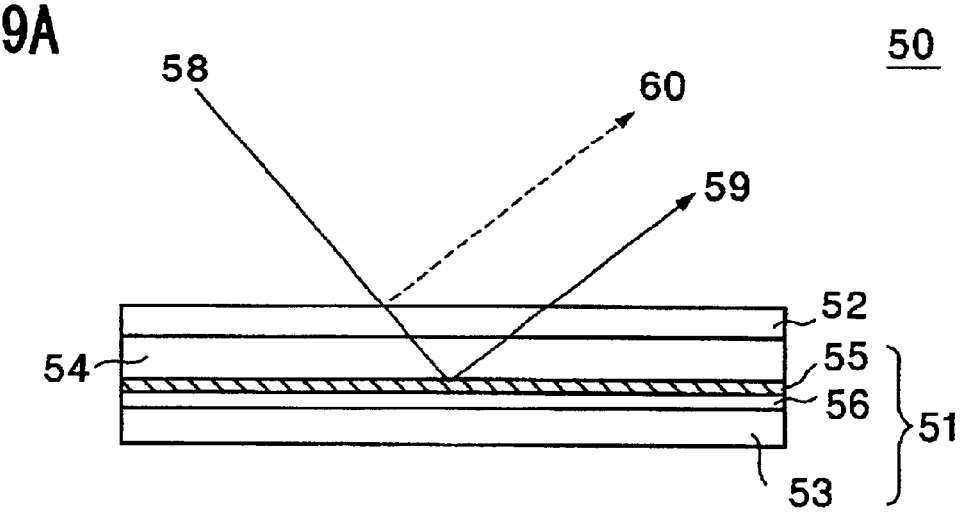
FIGS. 9A, 9B and 9C show explanatory diagrams of a conventional reflective liquid crystal display unit.
Figure 9B:
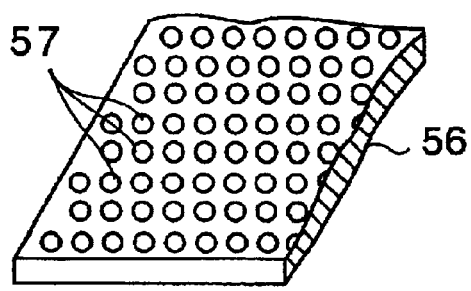
Figure 9C:
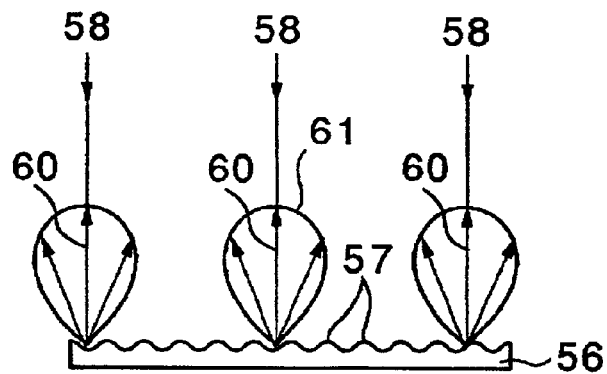

FIG. 8 shows a wireless information transmission apparatus 39 such as cellular phone or low power consumption type wireless appliance using the reflective liquid crystal display unit 10 having the reflective plate of the embodiment in the display device.

In the wireless information transmission apparatus 39 having such configuration, as shown in FIG. 8, the image of a monitor screen 40 can be viewed from the exit region 14 formed in a region different from the regular reflection region of the incident light as compared with the light entering the monitor screen 40 perpendicularly, so that a bright and clear image high in contrast and free from color mixture can be observed.

The embodiment can be applied not only in the wireless information transmission apparatus 39, but also in other electronic appliances such as electronic pocketbook, laptop computer, portable television and other portable information terminals.

What is claimed is:

1. An optical component comprising:

a substrate;

a reflective layer disposed on said substrate; and a color filter, wherein said reflective layer has a plurality of reflective unit regions each of which has a first reflective surface for reflecting a light in a predetermined direction, and an inclination angle of said first reflective surface is defined so that an incident light which passes through a pixel of a determined color of said color filter to enter said first reflective surface is reflected by said first reflective surface to pass through the pixel of the same color as the color through which said incident light of said color filter has passed, wherein said reflective unit region includes a second reflective surface for reflecting the light in a direction different from said first reflective surface, and inclination angles of said first reflective surface and said second reflective surface are defined so that a light, which passes through said color filter to enter said second reflective surface, is reflected by said second reflective surface, is reflected by said first reflective surface, and then passes through said color filter to emit outside, and wherein a condition that $2\alpha+2\beta>140°$ is satisfied when $\alpha$ is the inclination angle of said first reflective surface with respect to the horizontal substrate direction and $\beta$ is the inclination angle of said second reflective surface with respect to the horizontal substrate direction.

2. The optical component of claim 1, wherein said first reflective surface and said second reflective surface are disposed adjacently to each other through a coupling portion.

3. The optical component of claim 1, wherein an area of said first reflective surface is larger than that of said second reflective surface.

4. The optical component of claim 1, wherein the inclination angle of said first reflective surface is smaller than that of said second reflective surface.

5. A liquid crystal display unit comprising:

a substrate;

a reflective layer disposed on said substrate;

a liquid crystal layer disposed on an opposite side to said substrate of said reflective layer; and a color filter disposed on an opposite side to said substrate of said reflective layer, wherein said reflective layer has a plurality of reflective unit regions each of which has a first reflective surface for reflecting a light in a predetermined direction, and an inclination angle of said first reflective surface is defined so that an incident light, which passes through said liquid crystal layer and a pixel of a predetermined color of said color filter to enter said first reflective surface, is reflected by said first reflective surface to pass through the pixel of the same color as the color through which said incident light of said color filter has passed, and wherein said reflective unit region includes a second reflective surface for reflecting the light in a direction different from said first reflective surface, and inclination angles of said first reflective surface and said second reflective surface are defined so that a light, which passes through said color filter to enter said second reflective surface, is reflected by said second reflective surface, is reflected by said first reflective surface, and then passes through said color filter to emit outside, and wherein a condition that $2\alpha+2\beta>140°$ is satisfied when $\alpha$ is the inclination angle of said first reflective surface with respect to the horizontal substrate direction and $\beta$ is the inclination angle of said second reflective surface with respect to the horizontal substrate direction.

6. The liquid crystal display unit of claim 5, wherein said first reflective surface and said second reflective surface are disposed adjacently to each other through a coupling portion.

7. The liquid crystal display unit of claim 5, wherein an area of said first reflective surface is larger than that of said second reflective surface.

8. The liquid crystal display unit of claim 5, wherein the inclination angle of said first reflective surface is smaller than that of said second reflective surface.

9. A reflective plate comprising:

a substrate; and a reflective layer disposed on said substrate, wherein said reflective layer has a plurality of reflective unit regions each of which has a first reflective surface for reflecting a light in a predetermined direction, and a second reflective surface for reflecting a light in a direction different from that of said first reflective surface, and a reflected light, which is reflected by said second reflective surface, is reflected by the first reflective surface, which is disposed adjacently to said second reflective surface through a coupling portion, to emit in a direction different from said emission region, wherein a condition that $2\alpha+2\beta>140°$ is satisfied when $\alpha$ is the inclination angle of said first reflective surface with respect to the horizontal substrate direction and $\beta$ is the inclination angle of said second reflective surface with respect to the horizontal substrate direction.

10. An electronic device comprising:

a liquid crystal display unit disposed in an image display part, wherein said liquid crystal display unit comprises;

a substrate;

a reflective layer disposed on said substrate;

a liquid crystal layer disposed on an opposite side to said substrate of said reflective layer; and a color filter disposed on an opposite side to said substrate of said reflective layer; and said reflective layer has a plurality of reflective unit regions each of which has a first reflective surface for reflecting a light in a predetermined direction, and an inclination angle of said first reflective surface is defined so that an incident light, which passes through said liquid crystal layer and a pixel of a predetermined color of said color filter to enter said first reflective surface, is reflected by said first reflective surface to pass through the pixel of the same color as the color through which said incident light of said color filter has passed, and wherein said reflective unit region includes a second reflective surface for reflecting the light in a direction different from said first reflective surface, and inclination angles of said first reflective surface and said second reflective surface are defined so that a light, which passes through said color filter to enter said second reflective surface, is reflected by said second reflective surface, is reflected by said first reflective surface, and then passes through said color filter to emit outside, wherein a condition that $2\alpha+2\beta>140°$ is satisfied when $\alpha$ is the inclination angle of said first reflective surface with respect to the horizontal substrate direction and $\beta$ is the inclination angle of said second reflective surface with respect to the horizontal substrate direction.

* * * * *